United States Patent
Yahagi

(10) Patent No.: US 6,924,842 B2
(45) Date of Patent: Aug. 2, 2005

(54) FOCUSING STATE DETERMINING ADAPTER FOR TAKING LENS

(75) Inventor: Satoshi Yahagi, Saitama (JP)

(73) Assignee: Fujinon Corporation, Saitama (JP)

( * ) Notice: Subject to any disclaimer, the term of this patent is extended or adjusted under 35 U.S.C. 154(b) by 662 days.

(21) Appl. No.: 10/108,554

(22) Filed: Mar. 29, 2002

(65) Prior Publication Data

US 2002/0140839 A1 Oct. 3, 2002

(30) Foreign Application Priority Data

Mar. 30, 2001 (JP) ........................................ 2001-100487

(51) Int. Cl.[7] .............................................. H04N 5/225
(52) U.S. Cl. ....................... 348/360; 348/337; 348/350; 348/351
(58) Field of Search ................................ 348/349, 350, 348/345, 375, 360, 361; 396/79, 80, 83, 71, 89, 529, 111

(56) References Cited

U.S. PATENT DOCUMENTS 4,508,443 A * 4/1985 Matsuzaki et al. .......... 396/103
4,812,911 A * 3/1989 Ohshima et al. ............ 348/368
6,157,781 A * 12/2000 Konno et al. ................. 396/71
6,363,220 B1 * 3/2002 Ide .............................. 396/98

FOREIGN PATENT DOCUMENTS

| JP | 55076312 A | 6/1980 |
| JP | 62247314 A | 10/1987 |
| JP | 7-60211 | 6/1995 |

* cited by examiner

Primary Examiner—Ngoc-Yen Vu
Assistant Examiner—Anthony J. Daniels
(74) Attorney, Agent, or Firm—Harness, Dickey & Pierce, P.L.C.

(57) ABSTRACT

The focusing state determining adapter is detachably mounted between an interchangeable taking lens and a camera body in a camera system. The focusing state determining adapter includes a focus-imaging element and a beam splitter, which divides the subject light entering through the taking lens into light entering the focus-imaging element and light entering the camera body. The focusing state determining adapter determines the focusing state of the taking lens according to an image captured by the focus-imaging element.

16 Claims, 11 Drawing Sheets

FOCUSING STATE DETERMINING ADAPTER FOR TAKING LENS

BACKGROUND OF THE INVENTION

1. Field of the Invention

The present invention relates to a focusing state determining adapter for a taking lens, and more particularly, to a focusing state determining adapter for a taking lens which is applied for determining a focusing state in autofocus control of the taking lens.

2. Description of the Related Art

As an autofocus method in video cameras, a contrast method is used where the best focus is sought so that contrast of images formed on the imaging element becomes the largest. The problem of the contrast method is that the focusing operation is slow, since a hill-climbing method is adopted where the best focus at which the contrast is the largest is achieved while the focus lens is being moved.

Japanese Patent Application Publication No. 55-76312 and Japanese Patent Publication No. 7-60211 disclose a method for determining a focusing state (i.e., a front focusing state, a rear focusing state or a just focusing state) of the taking lens by using a plurality of imaging elements to which optical path lengths from the taking lens are different from each other. For example, two imaging elements for determining a focusing state (hereinafter referred to as "focus-imaging elements"), which take images of the same visual fields with another imaging element that takes an image for picturing (hereinafter referred to as a "picture-imaging element"), are arranged at positions to which optical path lengths from the taking lens are longer and shorter, respectively, than the optical path length from the taking lens to the picture-imaging element. High frequency components are extracted from signals of the images taken by the focus-imaging elements. Then, focus evaluation values, which indicate focusing degree (contrast) with respect to the imaging faces of the focus-imaging elements, are obtained according to the extracted high frequency components. The obtained focus evaluation values are then compared to each other, so that it is determined that the focusing state with respect to the imaging face of the picture-imaging element is a front focusing state, a rear focusing state, or a just focusing state. Thus, the focus determination for the autofocus control can be made. Applying this focusing state determining method has an advantage in that the focusing operation can be fast, since it can be determined not only whether the focusing state is the just focus, but also whether the focusing state is the front focus or the rear focus when not the just focus.

As high-definition television broadcasting has become generalized in recent years, the resolving power of the taking lenses and the cameras that are used in the television camera system has become higher. In the actual taking of pictures for the high-definition television with manual focus, it is difficult to achieve the best focus, since the operator focuses the taking lens while referring to pictures in a viewfinder with his or her own eye and there are limits of the resolving power of the viewfinder and eye. Even if the operator has determined that an image is in the just focus while taking, in some cases the image is discovered to be out of focus while being replayed on a large-sized monitor. Therefore, the autofocus function becomes necessary for focusing the taking lens more accurately than the manual focus.

However, the general television camera does not have the autofocus function, and it is not practical that the autofocus function is provided to all cameras in future, since not all the operators use the autofocus function. Therefore, it is considered that the cases will increase that the autofocus function cannot be used in spite of eager for using, in the camera systems already on sale and the camera systems on sale in future.

SUMMARY OF THE INVENTION

The present invention has been achieved considering these situations, and has an object to provide a focusing state determining adapter that can be easily incorporated into a camera system that has no autofocus function so as to provide the camera system with autofocus function.

In order to attain the above described object, the present invention is directed to a focusing state determining adapter to be arranged between an interchangeable taking lens and a camera body including a picture-imaging device, subject light entering the focusing state determining adapter through the taking lens, the focusing state determining adapter comprising: a focus-imaging device; a first beam splitter which is arranged on an optical path of the subject light between the taking lens and the camera body and splits the subject light into light entering the picture-imaging device of the camera body and light entering the focus-imaging device; a case which holds the focus-imaging device and the first beam splitter; and a mounting member which detachably mounts the taking lens and the camera body on the case, wherein a focusing state of the taking lens with respect to the picture-imaging device is determined according to an image captured by the focus-imaging device.

Preferably, the focus-imaging device comprises first and second focus-imaging elements; the focusing state determining adapter further comprises a second beam splitter which splits the subject light entering the focus-imaging device into light entering the first focus-imaging element and light entering the second focus-imaging element; an optical path length from the taking lens to the first focus-imaging element is longer than an optical path length from the taking lens to the picture-imaging device; and an optical path length from the taking lens to the second focus-imaging element is shorter than the optical path length from the taking lens to the picture-imaging device.

Preferably, the focusing state determining adapter further comprises a moving device which arranges and removes the first beam splitter on and from the optical path of the subject light between the taking lens and the camera body while the case of the focusing state determining adapter remains between the taking lens and the camera body.

Preferably, the focusing state determining adapter further comprises a signal processing device which determines whether the taking lens is in focus with respect to the picture-imaging device according to the image captured by the focus-imaging device.

The focusing state determining adapter can be applied for determining the focusing state of the taking lens in autofocus control of the taking lens.

According to the present invention, the case holding optical members to determine the focusing state of the taking lens can be detachably mounted between the taking lens and the camera body, so that the focusing state determining adapter can be easily incorporated in the camera system. Thus, even if a camera system has no autofocus function, autofocus can be performed in the camera system with the focusing state determining adapter.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
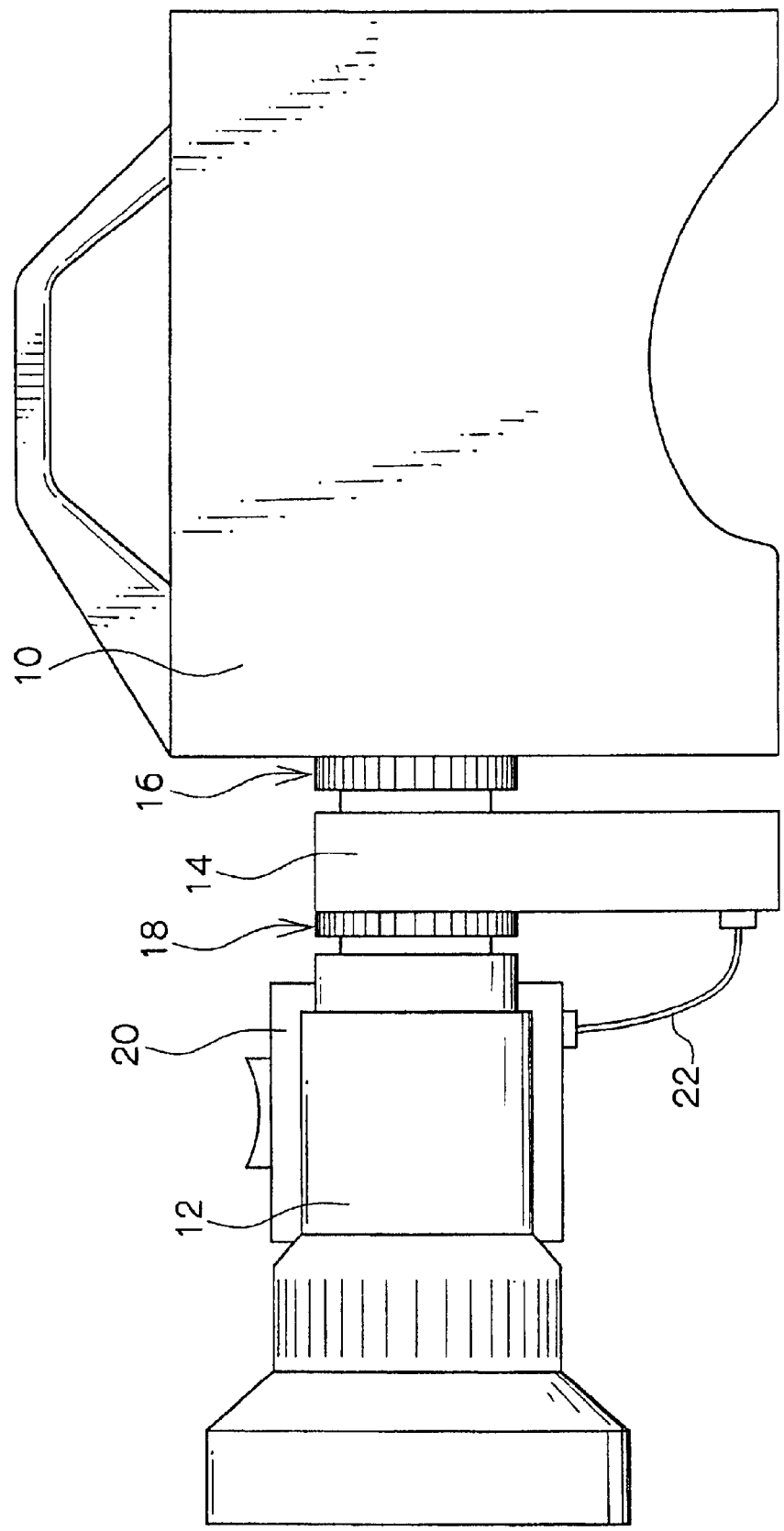
FIG. 1 is a side view of a camera system, in which a focusing state determining adapter according to an embodiment of the present invention is mounted.

FIG. 1 is a side view of a television camera system in which a focusing state determining adapter according to an embodiment of the present invention is mounted. A camera body 10 shown in FIG. 1 is a potable ENG camera, which includes imaging elements for taking television pictures (picture-imaging elements) and necessary circuits that output video signals in a predetermined form or record the video signals into a recording medium. A bayonet mount 16 is provided on a front face of the camera body 10. An interchangeable taking lens 12 is usually mounted on the bayonet mount 16, whereas a rear face of the focusing state determining adapter 14 is attached on the camera body 10 through the bayonet mount 16 in the present embodiment shown in FIG. 1.

A bayonet mount 18 is provided on a front face of the focusing state determining adapter 14, and the bayonet mount 18 is identical with the bayonet mount 16 on the front face of the camera body 10. The taking lens 12 is mounted to the focusing state determining adapter 14 through the bayonet mount 18.

In the present embodiment, the focusing state determining adapter 14 is used for autofocus control and is electrically connected through a cable 22 to a drive unit 20 arranged on the side face of the taking lens 12. The drive unit 20 rotationally drives a focus ring, a zoom ring and an iris ring arranged on the taking lens 12 with motors (not shown) provided in the drive unit 20. The focusing state determining adapter 14 determines a focusing state of the taking lens 12 as described later, and applies a control signal to the drive unit 20 to drive the focus ring so as to control the focus point as being in just focus.

Figure 2:
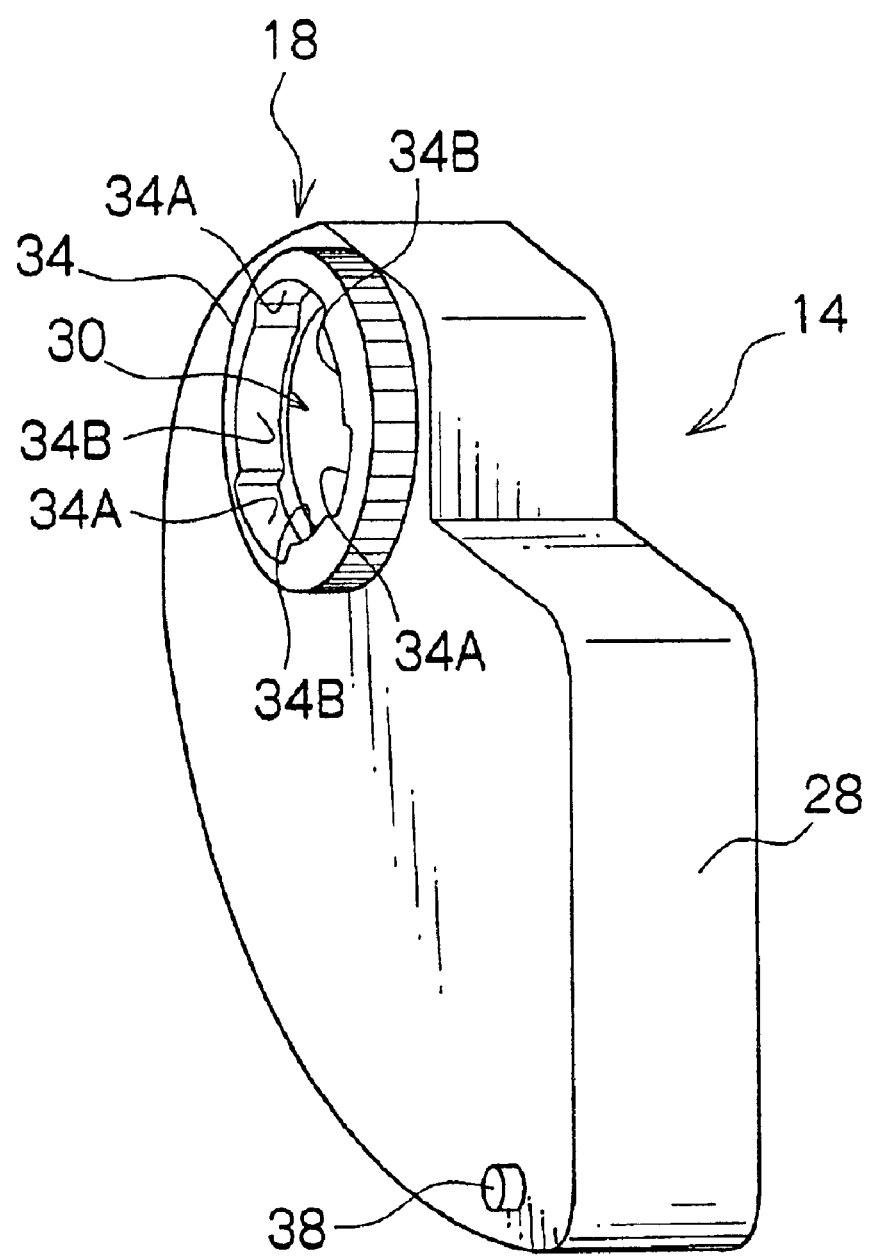
FIG. 2 is a perspective view showing the structure of the front face side of the focusing state determining adapter.
Figure 3:
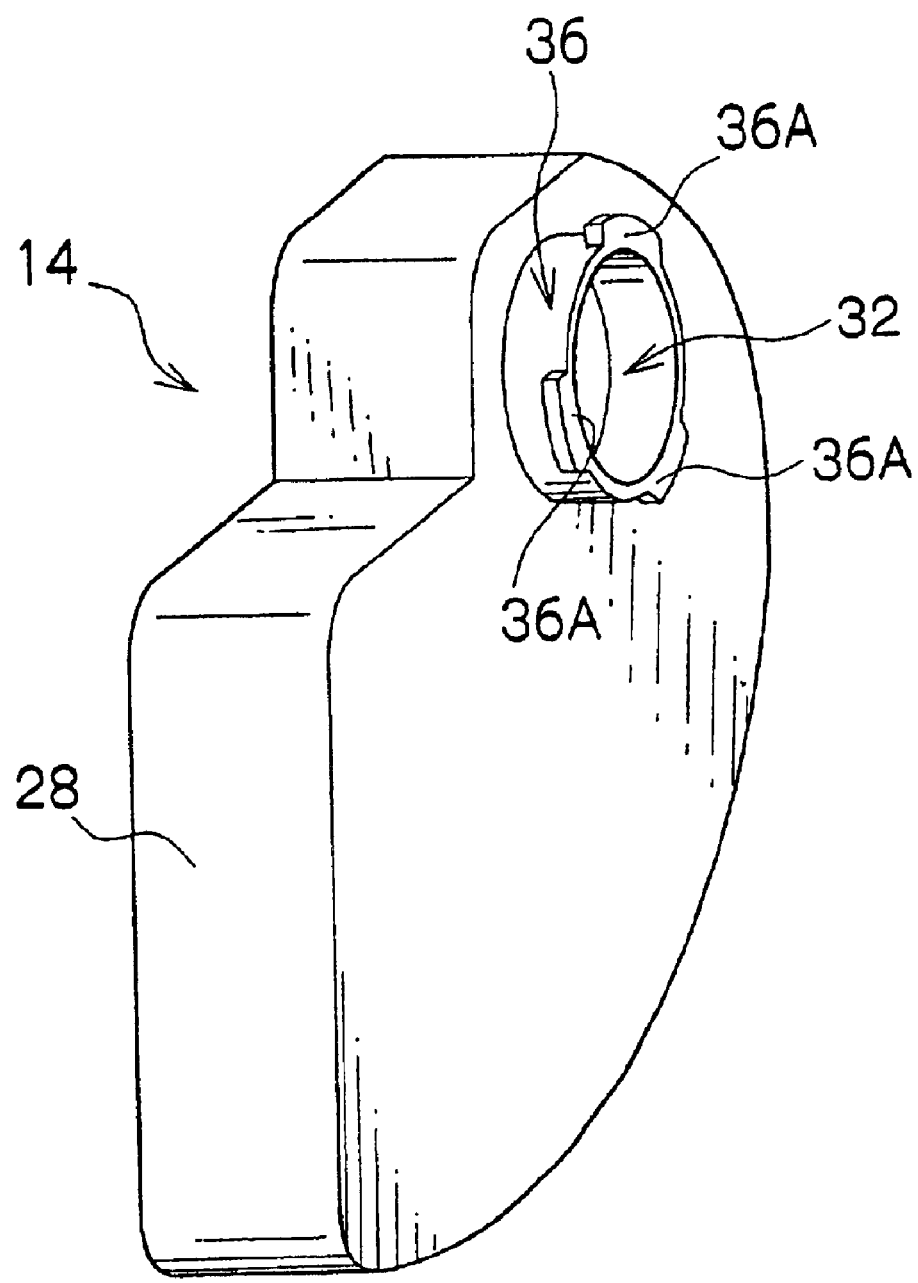
FIG. 3 is a perspective view showing the structure of the rear face side of the focusing state determining adapter.

FIGS. 2 and 3 are perspective views of construction of the front face side and the rear face side, respectively, of the focusing state determining adapter 14. The focusing state determining adapter 14 is covered with a case 28, and openings 30 and 32 are formed on the front face and the rear face, respectively, of the case 28 so that axes of the openings 30 and 32 coincide.

As shown in FIG. 2, the opening 30 in the front face of the focusing state determining adapter 14 is provided with the bayonet mount 18. The bayonet mount 18 includes a rotatable mount ring 34, which has recesses 34A and projections 34B arranged in constant intervals on the inner periphery of the mount ring 34. Bayonets projecting from the base or rear end of the taking lens 12 in radial directions are fitted into the recesses 34A of the mount ring 34 from the front face of the case 28, the mount ring 34 is then turned so that the bayonets are engaged to the projections 34B of the mount ring 34, and the taking lens 12 is thus mounted to the focusing state determining adapter 14.

A connector 38 is arranged on the front face of the focusing state determining adapter 14, and the cable 22 shown in FIG. 1 is connected to the focusing state determining adapter 14 through the connector 38.

As shown in FIG. 3, the opening 32 in the rear face of the focusing state determining adapter 14 is provided with a mount coupling 36 in the same manner as the rear end of the taking lens 12. The mount coupling 36 has bayonets 36A projecting from the end thereof in radial directions. The focusing state determining adapter 14 is mounted on the camera body 10 in the same manner as to mount the taking lens 12 on the focusing state determining adapter 14.

Figure 4:
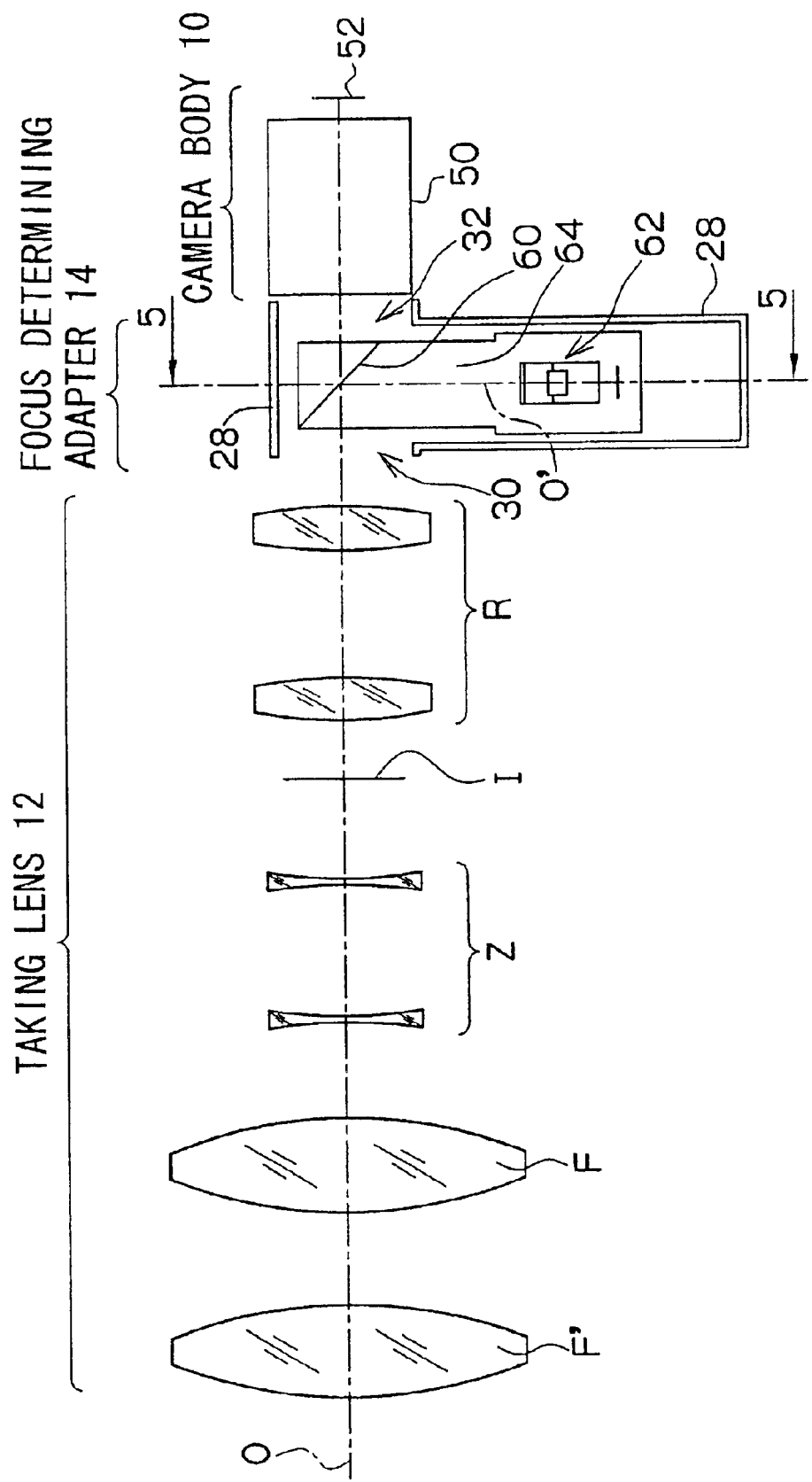
FIG. 4 is a view showing the optical system in the camera system.

FIG. 4 is a view showing the construction of the optical system in the camera system in FIG. 1. A fixed focus lens F', a movable focus lens F, a zoom lens Z including a zooming system and a correcting system, an iris I, a relay lens R, etc. are arranged in the taking lens 12 in this order from the front end (the left-hand end in FIG. 4) of the optical system. These lenses are roughly shown in FIG. 4, and each of the lenses may be a group of a plurality of lenses. The subject light enters the taking lens 12 through the front end, goes through the lenses arranged in the taking lens 12, and exits the taking lens 12 through the rear end.

In the focusing state determining adapter 14, a beam splitter 60 is arranged on the optical axis O of the taking lens 12 such that the beam splitter 60 is inclined at substantially 45 degrees with respect to the optical axis O. The beam splitter 60 includes a semitransparent mirror in this embodiment, and may include a prism or other optical devices instead of the semitransparent mirror. The subject light exiting the taking lens 12 through the rear end of the taking lens 12 enters the beam splitter 60 through the opening 30 formed in the front face of the case 28 of the focusing state determining adapter 14, and the subject light is split by the beam splitter 60 into penetrating light and reflecting light.

The subject light penetrating through the beam splitter 60 exits the focusing state determining adapter 14 through the opening 32 formed in the rear face of the case 28, and enters an imaging part 50 of the camera body 10. Although the construction of the imaging part 50 is not illustrated in detail, the subject light entering the imaging part 50 is decomposed into a red light, a blue light and a green light by a color separation optical system, and each of the red, blue and green lights enters an imaging face of the picture-imaging element of each color. The color picture for television is thus taken. A focus plane 52 shown in FIG. 4 represents a plane conjugate to each of the imaging faces of the picture-imaging elements on the optical axis O of the taking lens 12.

On the other hand, the subject light reflecting on the beam splitter 60 advances along the optical axis O' substantially perpendicular to the optical axis O, and enters an imaging part 62 arranged in the case 28 of the focusing state determining adapter 14.

Figure 5:
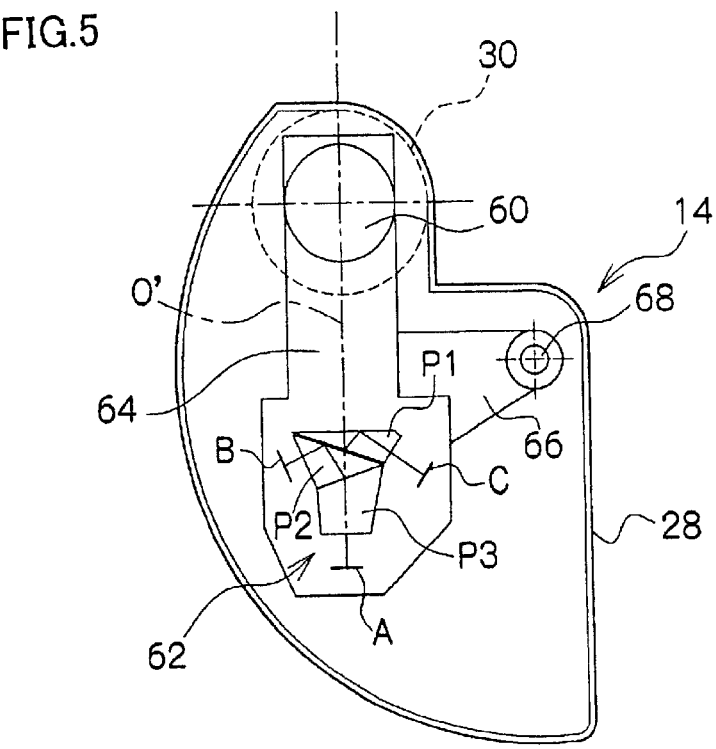
FIG. 5 is a sectional partially schematic view of the focusing state determining adapter taken along line 5—5 in FIG. 4.
Figure 6:
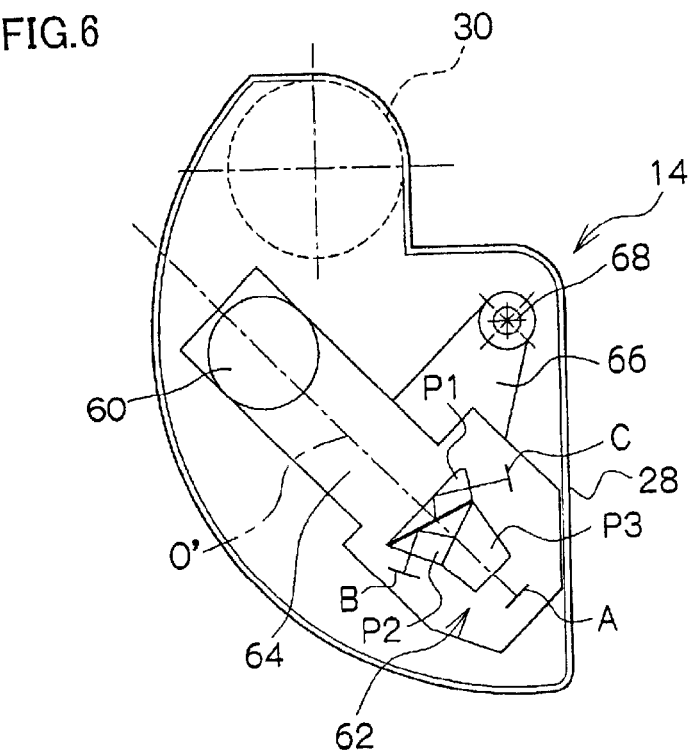
FIG. 6 is a sectional partially schematic view of the focusing state determining adapter taken along line 5—5 in FIG. 4, where a beam splitter is removed from the optical path of the subject light.

FIG. 5 is a sectional view of the focusing state determining adapter 14 along line 5—5 in FIG. 4. As shown in FIG. 5, the beam splitter 60 and the imaging part 62 are held in a holding member 64. The beam splitter 60 is arranged at a position to which the subject light exiting the taking lens 12 through the rear end of the taking lens 12 enters through the opening 30 of the case 28, and the imaging part 62 is arranged at a position to which the subject light reflecting on the beam splitter 60 enters. The holding member 64 is connected to a supporting member 66, which is rotatably supported on an axis 68. By this configuration, the beam splitter 60 can be removed from the position facing the opening 30, that is, from the optical path of the subject light between the taking lens 12 and the camera body 10 by turning the supporting member 66 on the axis 68 as shown in FIG. 6. When the autofocus function is not used, the beam splitter 60 can be removed from the optical path of the subject light, without removing the focusing state determining adapter 14 from the camera system, so as not to reduce the amount of the subject light entering the picture-imaging elements. To arrange and remove the beam splitter 60 on and from the optical path of the subject light, the holding member 64 can be mechanically turned on the axis 68 by operations of a mechanical switching member (not shown), or can be turned by a motor (not shown) according to operations of an electric switching member (not shown).

Figure 7:
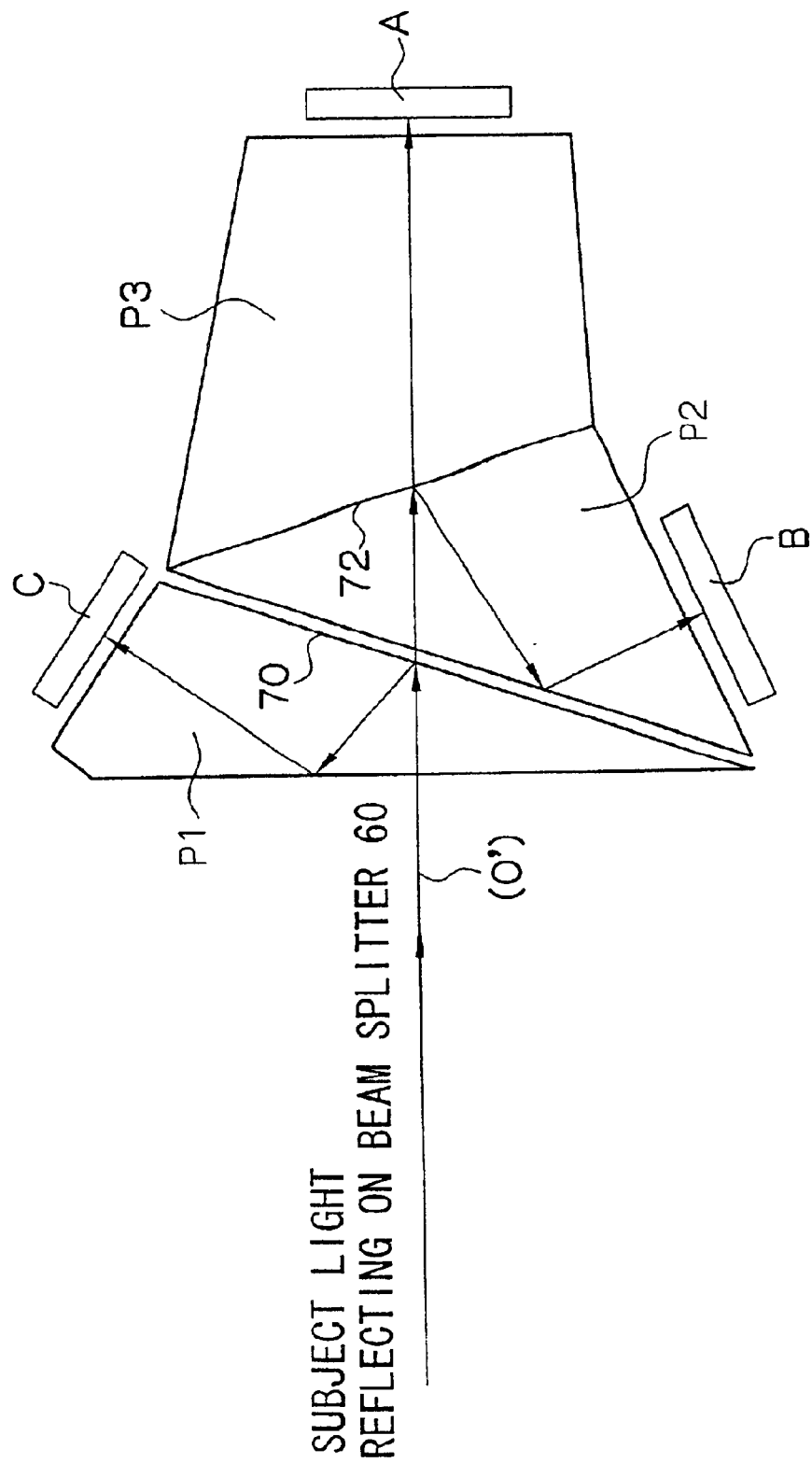
FIG. 7 is a view showing the structure of the imaging part of the focusing state determining adapter.

FIG. 7 is a view showing a construction of the imaging part 62. As shown in FIG. 7, the imaging part 62 comprises first, second and third prisms P1, P2 and P3, which compose a splitting optical system, and three focus-imaging elements A, B and C, which are two-dimensional charge-coupled devices (CCDs) in the present embodiment. The subject light reflecting on the beam splitter 60 and advancing along the optical axis O' enters the first prism P1, and is split on a beam splitter or a semitransparent mirror face 70 on the first prism P1 into reflecting light and penetrating light. This reflecting light enters an imaging face of the focus-imaging element C. Then, this penetrating light enters the second prism P2, and is further split on a beam splitter or a semitransparent mirror face 72 on the second prism P2 into reflecting light and penetrating light. This reflecting light enters an imaging face of the focus-imaging element B. Then, this penetrating light enters an imaging face of the focus-imaging element A through the third prism P3. The transparentnesses of the semitransparent mirror faces 70 and 72 of the prisms P1 and P2 are adjusted so that the amounts of the subject light entering the focus-imaging elements A, B and C are equal to each other. It is unnecessary for the focus-imaging elements A, B and C to be color imaging elements, and they are CCDs taking black-and-white pictures in the present embodiment.

Figure 8:
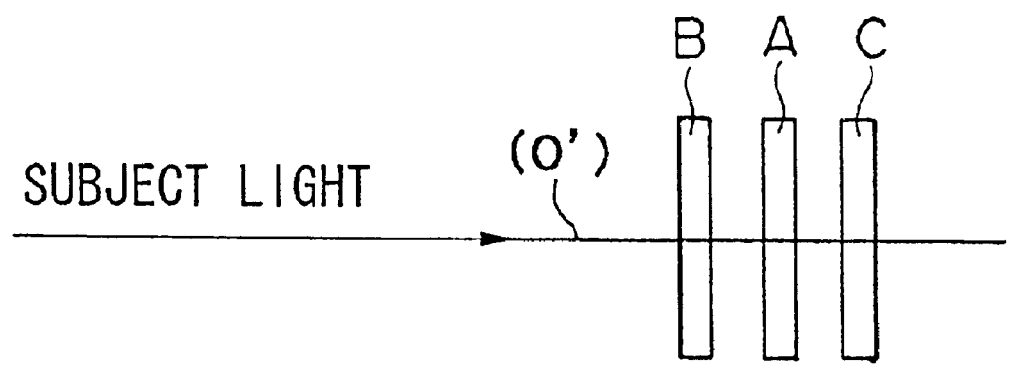
FIG. 8 is a view showing the focus-imaging elements A, B and C on the same optical axis.

In FIG. 8, optical paths of the subject light entering the focus-imaging elements A, B and C are drawn on the same optical axis O'. The optical path lengths from the taking lens 12 are the shortest to the focus-imaging element B, the longest to the focus-imaging element C, and the middle to the focus-imaging element A. More specifically, the imaging face of the focus-imaging element A is conjugate to the focus plane 52 (see FIG. 4) of the camera body 10, and the optical path length from the taking lens 12 to the imaging face of the focus-imaging element A is equal to the optical path lengths from the taking lens 12 to the imaging faces of the picture-imaging elements. The imaging faces of the focus-imaging elements B and C are arranged perpendicular to the optical axis O' so that the difference in the optical path lengths from the taking lens 12 between the focus-imaging elements B and A is equal to the difference in the optical path lengths from the taking lens 12 between the focus-imaging elements A and C. The splitting optical system to split the subject light to the focus-imaging elements A, B and C is not limited to the construction of using the prisms P1 to P3.

In the above-described optical system in the focusing state determining adapter 14, the subject light entering the taking lens 12 is imaged by the three focus-imaging elements A, B and C, which are arranged around the position conjugate to the focus plane 52 of the camera body 10 and to which optical lengths from the taking lens 12 are different to each other.

The autofocus control with the focusing state determining adapter 14 will be described in reference to a block diagram shown in FIG. 9, wherein the above-described members shown in FIGS. 1–8 are denoted with the same references, and explanations of them will be omitted.

The image signals captured by the three focus-imaging elements A, B and C of the focusing state determining adapter 14 are sent to a signal processing unit 80 arranged in the focusing state determining adapter 14. The signal processing unit 80 obtains a position (a focus point) of the focus lens F, where the taking lens 12 is in focus with respect to the focus plane 52 (see FIG. 4) of the camera body 10, in accordance with high frequency components of the image signals sent from the focus-imaging elements A, B and C as described later. Then, the signal processing unit 80 applies a control signal to a focus motor driving circuit 82 of the drive unit 20 (see FIG. 1) so as to move the focus lens F to the focus point. The focus motor driving circuit 82 drives a focus motor (not shown) to move the focus lens F through a power transmission mechanism 84 such as gears, so that the focus lens F is placed at the focus point determined by the signal processing unit 80 of the focusing state determining adapter 14. The autofocus is thus controlled by continuously performing these procedures.

Figure 10:
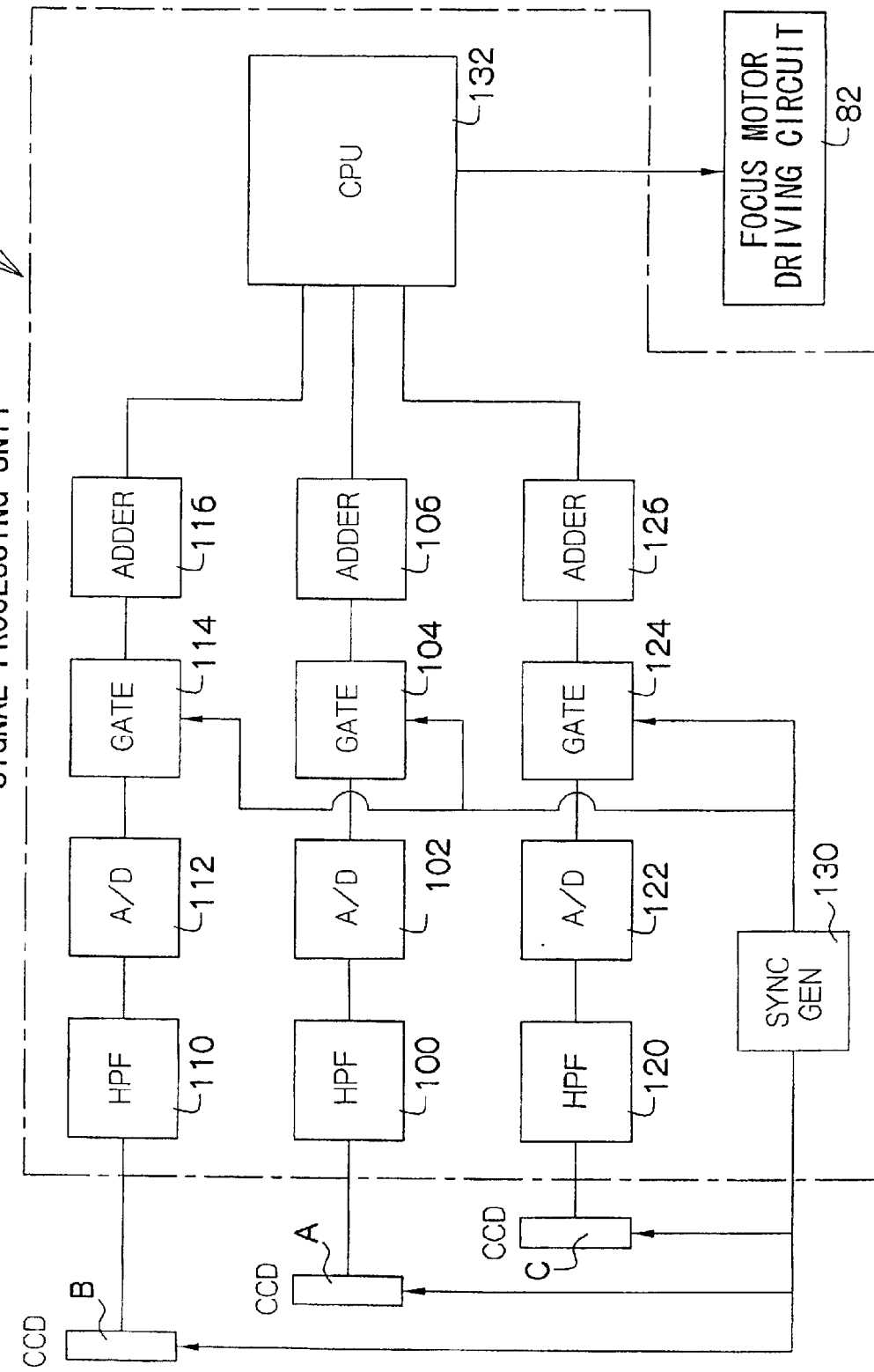
FIG. 10 is a block diagram of construction of a signal processing unit of the focusing state determining adapter.

Next, a construction and a process in the signal processing unit 80 of the focusing state determining adapter 14 will be described. FIG. 10 is a block diagram of the construction of the signal processing unit 80. The images of the subject captured by the focus-imaging elements A, B and C are outputted as image signals in a prescribed form. Each of the image signals is converted into a signal of a focus evaluation value representing sharpness (contrast) of the image through high-pass filter (HPF) 100, 110 or 120, A/D converter 102, 112 or 122, gate circuit 104, 114 or 124, and adder 106, 116 or 126, which are constructed in the same manner with respect to the focus-imaging elements A, B and C, and the signal of the focus evaluation value is applied to a CPU 132.

For example, the focus evaluation value is obtained through the circuit provided with respect to the focus-imaging element A as follows. The image signals outputted from the focus-imaging element A are the luminance signals representing the luminance of pixels constructing the screen, since the focus-imaging element A is the black-and-white CCD in the present embodiment. The image signals are inputted to the high-pass filter 100, and the high frequency components of the image signals are extracted. The high frequency components of the image signals extracted through the HPF 100 are converted into digital signals through the A/D converter 102. Then, only digital signals that correspond to the pixels within a predetermined focus area (for example, the center of the screen) are extracted by the gate circuit 104 from the digital signals for one screen (one field) of the image captured by the focus-imaging element A, and values of the extracted digital signals are added by the adder 106. The sum of the values of the high frequency components of the image signals within the focus area is thus obtained. The value obtained by the adder 106 is the focus evaluation value, which shows the sharpness of the image within the focus area.

Synchronizing signals are applied from a synchronizing signal generator 130 shown in FIG. 10 to the circuits such as the focus-imaging elements A, B and C, and the gate circuits 104, 114 and 124, so as to synchronize the operations of the circuits. A vertical synchronizing signal (V signal) for the image signal of every one field is also applied from the synchronizing signal generator 130 to the CPU 132.

Figure 11:
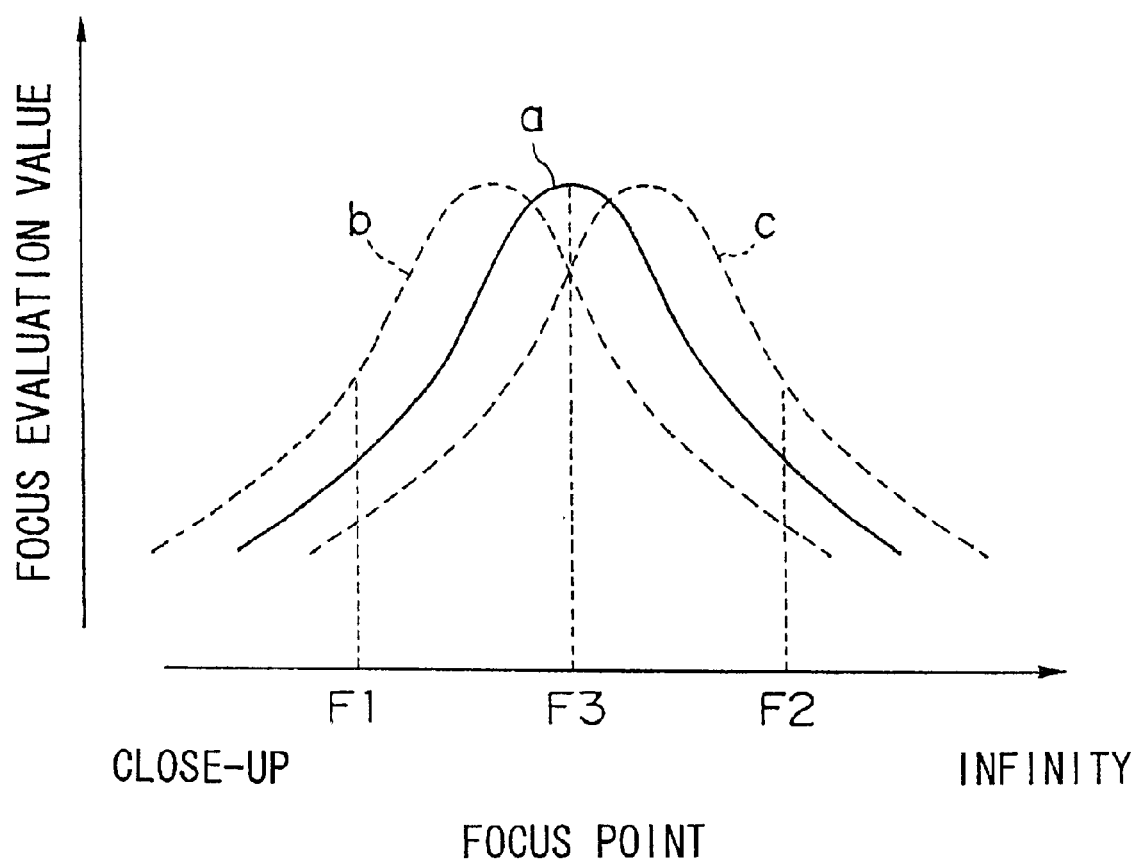
FIG. 11 is a graph showing focus evaluation values in focus-imaging elements with respect to focus points when a subject is taken.

According to the focus evaluation values thereby obtained from the focus-imaging elements A, B and C, the CPU 132 determines the present focusing state of the taking lens 12 with respect to the focus plane 52 of the camera body 10. FIG. 11 is a graph showing a state of the focus evaluation values with respect to the focus points when a certain subject is taken where the focus points of the taking lens 12 are set at a horizontal axis and the focus evaluation values are set at a vertical axis. A curve a in FIG. 11 of solid line shows the focus evaluation values that are obtained from the focus-imaging element A at the conjugate position of the focus plane 52 of the camera body 10 with respect to the focus points, and curves b and c in FIG. 11 of dotted line show the focus evaluation values that are obtained from the focus-imaging elements B and C, respectively, with respect to the focus points.

In FIG. 11, a focus point F3 with the largest (maximum) focus evaluation value of the curve a is the just-focus position. In the case where the focus point of the taking lens 12 is set at the position of F1 in FIG. 11, the focus evaluation values obtained from the focus-imaging elements A, B and C are values read on the curves a, b and c with respect to the focus point F1. Then, at least the fact that the focus evaluation value obtained from the focus-imaging element B is larger than the focus evaluation value obtained from the focus imaging element C, means that the focus point is at the close-up side than the focus point F3 of the focusing position, that is the front focusing state.

On the other hand, in the case where the focus point of the taking lens 12 is set at the position of F2 in FIG. 11, the focus evaluation values obtained from the focus-imaging elements A, B and C are values read on the curves a, b and c with respect to the focus point F2. Then, at least the fact that the focus evaluation value obtained from the focus-imaging element C is larger than the focus evaluation value obtained from the focus-imaging element B, means that the focus point is at the infinity side than the focus point F3 of the focusing position, that is the rear focusing state.

In the case where the focus point of the taking lens 12 is set at the just-focus position of F3 in FIG. 11, the focus evaluation values obtained from the focus-imaging elements A, B and C are values read on the curves a, b and c with respect to the focus point F3. Then, the fact that the focus evaluation value obtained from the focus-imaging element B is equal to the focus evaluation value obtained from the focus-imaging element C, means the focus point is at the just-focus point F3, that is the state of the just-focusing state.

In the above described, according to the focus evaluation values obtained from the focus-imaging elements A, B and C, the CPU 132 shown FIG. 10 can determine a focusing state of the present focus point of the taking lens 12 as the front focus, the rear focus, or the just-focus. Then, determining the focusing state in this manner, according to this decision, the CPU 132 can determine if the focus point should be moved to the front or the rear in order to focus the taking lens 12, the CPU 132 transmits the control signal to the focus motor driving circuit 82 of the drive unit 20 shown in FIGS. 9 and 10, and makes the focus lens F move to the point of focusing. Then, the focus lens F is stopped at the position where the just-focusing state is detected, and the autofocus is thus controlled.

However, for determining the focusing state by the manner described above, only the focus evaluation values obtained from the focus-imaging elements B and C are necessary, and the focus evaluation value obtained from the focus-imaging element A is not necessary. Then, in one embodiment, the focus evaluation values obtained from three focus-imaging elements A, B and C are effectively used as follows so that the focus point is directly determined.

Figure 12:
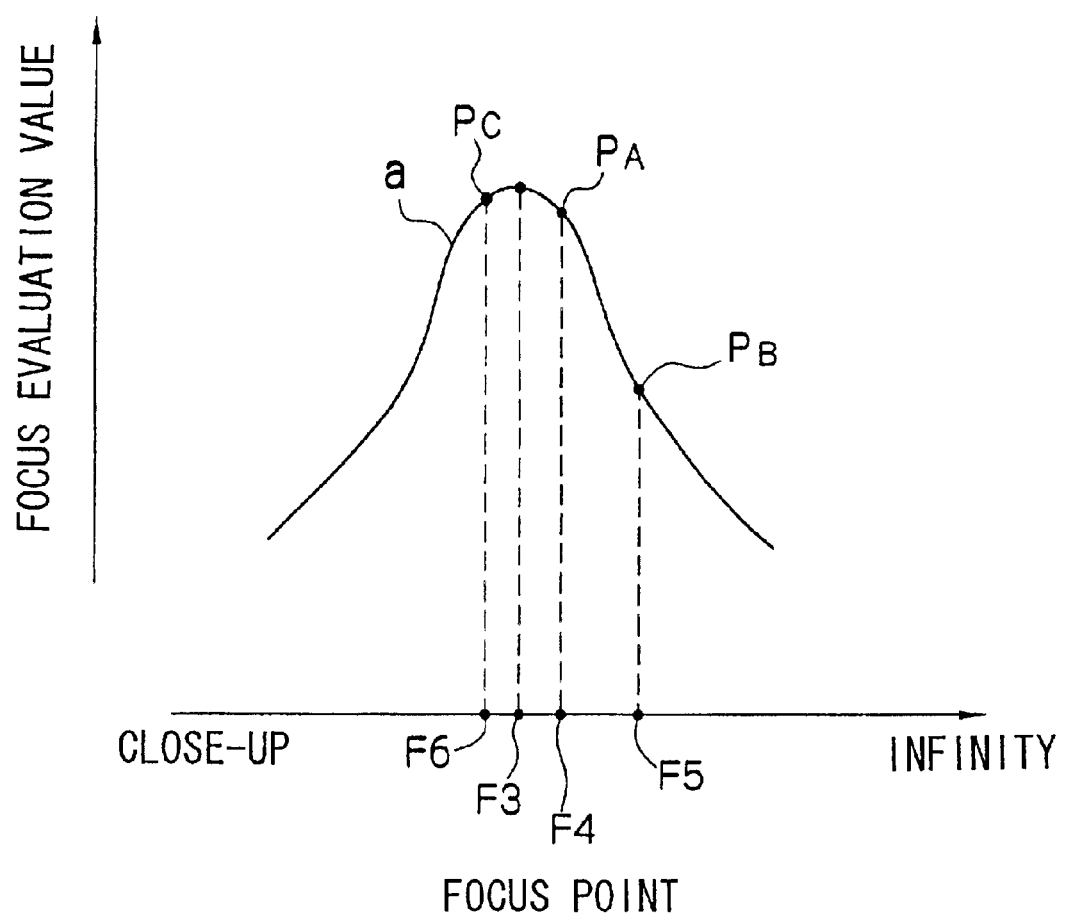
FIG. 12 is a graph for explaining how the focusing position is determined.

In FIG. 11, the focus evaluation values obtained from the focus-imaging elements B and C in a certain focus point are considered as the focus evaluation value of the focus-imaging element A in a focus point that is displaced by a predetermined shift quantity from the focus point, because the curves a, b and c with respect to the focus evaluation values obtained from the focus-imaging elements A, B and C have substantially the same form. For example, in the case where the focus point is set at the point F4 in the curve a of the focus evaluation value of the focus-imaging element A in FIG. 12, then the focus evaluation value obtained from the focus-imaging element A is a value of the point $P_A$ on the curve a. On the other hand, the focus evaluation value obtained from the focus-imaging element B is a value of the point $P_B$ on the curve a at the focus point F5, which is displaced by the predetermined shift quantity to the infinity side from the focus point F4, and the focus evaluation value obtained from the focus-imaging element C is a value of the point $P_C$ on the curve a at the focus point F6, which is displaced by the predetermined shift quantity to the close-up side from the focus point F4. Further, the difference between the focus point F4 and the focus point F5, that is the shift quantity in the focus evaluation value obtained from the focus-imaging element B is equal to the difference between the focus point of the maximum point of the curve b and the focus point of the maximum point of the curve a, for example, in FIG. 11. Then, the difference between the focus point F4 and the focus point F6, that is the shift quantity in the focus evaluation value obtained from the focus-imaging element C is equal to the difference between the focus point of the maximum point of the curve c and the focus point of the maximum point of the curve a, in FIG. 11.

On the other hand, it can be assumed that the curve a is represented as a predetermined function (quadratic function for example). Therefore, the curve a can be concretely specified from the focus evaluation values in three points $P_A$, $P_B$ and $P_C$, obtained from the focus-imaging elements A, B and C, and the focus position F3 where the focus evaluation value is the maximum on the curve a can be obtained.

Figure 9:
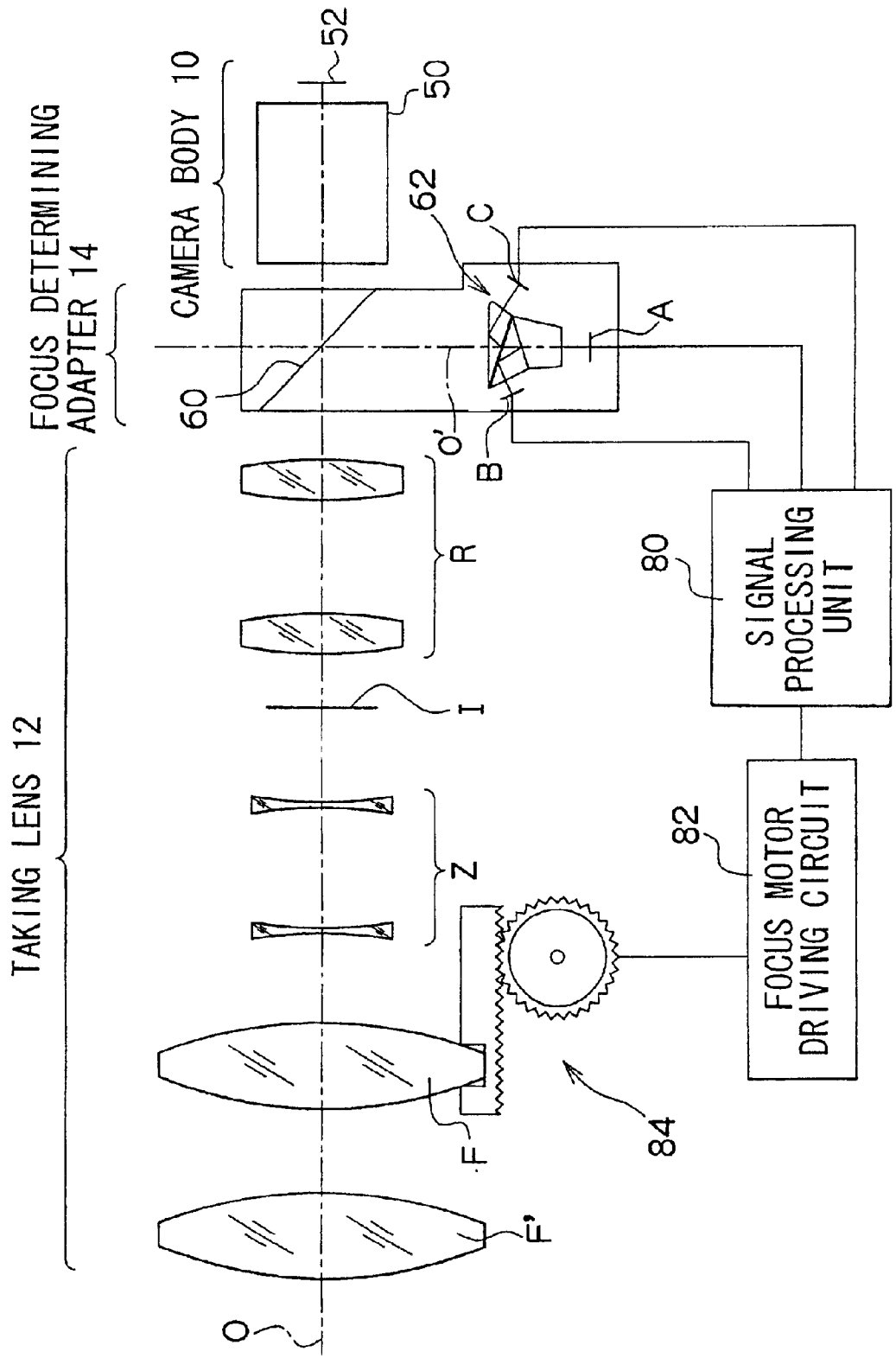
FIG. 9 is a view showing the structure of the camera system in relation to the autofocus control using the focusing state determining adapter.

The CPU 132 in FIG. 10 thus determines the just-focus position according to the focus evaluation values obtained from the focus-imaging elements A, B and C, the CPU 132 transmits the control signal to the focus motor driving circuit 82 of the drive unit 20 shown in FIGS. 9 and 10 so as to move the focus lens F accordingly. The autofocus is thus controlled.

In the above-described embodiments, the focus-imaging elements B and C are arranged front and behind with respect to the imaging face of the focus-imaging element A arranged at the conjugate position of the focus plane 52 of the camera body 10, and the differences in optical length from the taking lens 12 are equal to each other between the focus-imaging elements B and A and between the focus-imaging elements A and C. However, it is sufficient that the focus-imaging elements A, B and C are arranged so that the optical lengths are different, as well as at least two of the focus-imaging elements A, B and C are arranged at the positions to which optical lengths are respectively long and short with respect to the conjugate position of the focus plane 52 of the camera body 10. That is, in the case that the focus evaluation values obtained from the focus-imaging elements B and C in a certain focus point are considered as the focus evaluation value of the focus-imaging element A in the focus point displaced by a predetermined shift quantity from the focus point, it is proper that the shift quantity is set according to the distance to the focus-imaging element A from the focus-imaging elements B and C. Then, in the manner to obtain the shift quantity, for example, the focus point is changed during taking a fixed subject, and the focus point for which the focus evaluation value obtained from each of the focus-imaging elements A, B and C is largest is determined. Then with respect to the focus point for which the focus evaluation value obtained from the focus-imaging element A is largest, the displacement quantity of each focus point for which the focus evaluation value obtained from each of the focus-imaging elements B and C is largest is determined and the displacement quantity is considered as the predetermined shift quantity.

In the above-described embodiments, the imaging face of the focus-imaging element A is arranged at the conjugate position of the focus plane 52 of the camera body 10, but it is not necessary to do so. That is, in the same manner as well as with respect to the focus point for which the focus evaluation value obtained from the focus-imaging element A is largest, the displacement quantity of each focus point for which the focus evaluation value obtained from each of the focus-imaging elements B and C is largest is determined, with respect to the focus point obtained to the focusing in the focus plane 52 of the camera body 10, the displacement quantity of the focus point for which the focus evaluation value obtained from the focus-imaging element A is largest is determined and the displacement quantity is considered as the shift quantity for which the focus evaluation value obtained from the imaging element A. That is, it considered that the focus evaluation value obtained from the imaging element A is the focus evaluation value to the focus point displaced the shift quantity from the actual focus point. Further, a shift quantity of the focus evaluation value obtained from the imaging elements B, C is determined as the same manner. Therefore according to the focus evaluation value of each imaging element A, B, C obtained in some focus point, the curve of the focus evaluation value with respect to the focus plane 52 of the camera body 10 can be obtained, and the focus point obtained to the focusing by the curve can be obtained.

In the above-described embodiments, the three focus-imaging elements A, B and C are arranged in the imaging part 62 within the focusing state determining adapter 14; however, in the order that the device is put easily in the camera system with no device for determining the focusing state, the invention is not limited in the case of the embodiment above. That is, the device for determining the focusing state according to the subject light divided by the beam splitter 60 of the focusing state determining adapter 14 is not limited in the case of the embodiment above. For example, in the embodiment described above, it is proper that only two focus-imaging elements B and C are arranged front and behind with respect to the conjugate position of the focus plane 52 of the camera body 10, and it is determined that the focusing state is the front focusing state, the rear focusing state, or the just focusing state, so that the autofocus is controlled according to the determined result. On the contrary, it is proper that four or more focus-imaging elements to which optical lengths are different are used, at least one of the focus-imaging elements is arranged at each of the positions to which the optical length is respectively long and short with respect to the conjugate position of the focus plane 52 of the camera body 10, so that the focusing position is accurately determined. It is also proper that a single focus-imaging element is arranged at the conjugate position of the focus plane 52 of the camera body 10, and the hill-climbing focusing-method is adopted. That is, the focus point is adjusted by moving the focus point to the direction that the focus evaluation value obtained from the single focus-imaging element is increased so that the focus evaluation value can be largest. Here, in order to determine the direction that the focus evaluation value is increased, the wobbling method is used. To perform the wobbling method, it is proper that the focus lens F is moved, or the focus-imaging element is moved along the optical axis by a drive system.

In the above-described embodiment, the black-and-white CCDs are used as the focus-imaging elements, but color CCDs can be also used as the focus-imaging elements.

In the above-described embodiment, the signal processing unit 80 for determining the focusing state according to images captured by the focus-imaging elements A, B and C is arranged in the focusing state determining adapter 14; however, it is not necessary that the above process of the signal processing unit 80 is done in the focusing state determining adapter 14, and it is proper that all or some the above process of the signal processing unit 80 is done in part except the focusing state determining adapter 14.

In the above-described embodiment, it is described for the case where the focusing state determination by the focusing state determining adapter 14 is adapted to the autofocus function, but the process can be used for other purposes.

In the above-described embodiment, it is described that the case where the focusing state determining adapter 14 can be put in the portable ENG camera system; however, the invention can be applied in all type of camera system constructed to the camera body and the interchangeable taking lens.

As described above, according to the focusing state determining adapter for the taking lens according to the present invention, the case member in which optical member for determining the focusing state is received can be detachably mounted between the interchangeable taking lens and the camera body, so that the focusing state determining device can be put easily in the camera system, so that the camera system that has no function of the autofocus can perform autofocus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A focusing state determining adapter to be arranged between an interchangeable taking lens and a camera body including a picture-imaging device, subject light entering the focusing state determining adapter through the taking lens, the focusing state determining adapter comprising:
   a focus-imaging device;
   a first beam splitter which is arranged on an optical path of the subject light between the taking lens and the camera body and splits the subject light into light entering the picture-imaging device of the camera body and light entering the focus-imaging device;
   a case which holds the focus-imaging device and the first beam splitter; and
   a mounting member which detachably mounts the taking lens and the camera body on the case,
   wherein a focusing state of the taking lens with respect to the picture-imaging device is determined according to an image captured by the focus-imaging device.

2. The focusing state determining adapter as defined in claim 1, wherein the focusing state determining adapter is applied for determining the focusing state of the taking lens in autofocus control of the taking lens.

3. The focusing state determining adapter as defined in claim 1, further comprising a signal processing device which determines whether the taking lens is in focus with respect to the picture-imaging device according to the image captured by the focus-imaging device.

4. The focusing state determining adapter as defined in claim 3, wherein the focusing state determining adapter is applied for determining the focusing state of the taking lens in autofocus control of the taking lens.

5. The focusing state determining adapter as defined in claim 1, further comprising a moving device which arranges and removes the first beam splitter on and from the optical path of the subject light between the taking lens and the camera body while the case of the focusing state determining adapter remains between the taking lens and the camera body.

6. The focusing state determining adapter as defined in claim 5, wherein the focusing state determining adapter is applied for determining the focusing state of the taking lens in autofocus control of the taking lens.

7. The focusing state determining adapter as defined in claim 5, further comprising a signal processing device which determines whether the taking lens is in focus with respect to the picture-imaging device according to the image captured by the focus-imaging device.

8. The focusing state determining adapter as defined in claim 7, wherein the focusing state determining adapter is applied for determining the focusing state of the taking lens in autofocus control of the taking lens.

9. The focusing state determining adapter as defined in claim 1, wherein:
   the focus-imaging device comprises first and second focus-imaging elements;
   the focusing state determining adapter further comprises a second beam splitter which splits the subject light entering the focus-imaging device into light entering the first focus-imaging element and light entering the second focus-imaging element;
   an optical path length from the taking lens to the first focus-imaging element is longer than an optical path length from the taking lens to the picture-imaging device; and
   an optical path length from the taking lens to the second focus-imaging element is shorter than the optical path length from the taking lens to the picture-imaging device.

10. The focusing state determining adapter as defined in claim 9, wherein the focusing state determining adapter is applied for determining the focusing state of the taking lens in autofocus control of the taking lens.

11. The focusing state determining adapter as defined in claim 9, further comprising a signal processing device which determines whether the taking lens is in focus with respect to the picture-imaging device according to the image captured by the focus-imaging device.

12. The focusing state determining adapter as defined in claim 11, wherein the focusing state determining adapter is applied for determining the focusing state of the taking lens in autofocus control of the taking lens.

13. The focusing state determining adapter as defined in claim 9, further comprising a moving device which arranges and removes the first beam splitter on and from the optical path of the subject light between the taking lens and the camera body while the case of the focusing state determining adapter remains between the taking lens and the camera body.

14. The focusing state determining adapter as defined in claim 13, wherein the focusing state determining adapter is applied for determining the focusing state of the taking lens in autofocus control of the taking lens.

15. The focusing state determining adapter as defined in claim 13, further comprising a signal processing device which determines whether the taking lens is in focus with respect to the picture-imaging device according to the image captured by the focus-imaging device.

16. The focusing state determining adapter as defined in claim 15, wherein the focusing state determining adapter is applied for determining the focusing state of the taking lens in autofocus control of the taking lens.

* * * * *